W. S. WHYTE.
VALVE FOR PNEUMATIC TOOLS.
APPLICATION FILED JULY 19, 1919.
1,343,951.
Patented June 22, 1920.
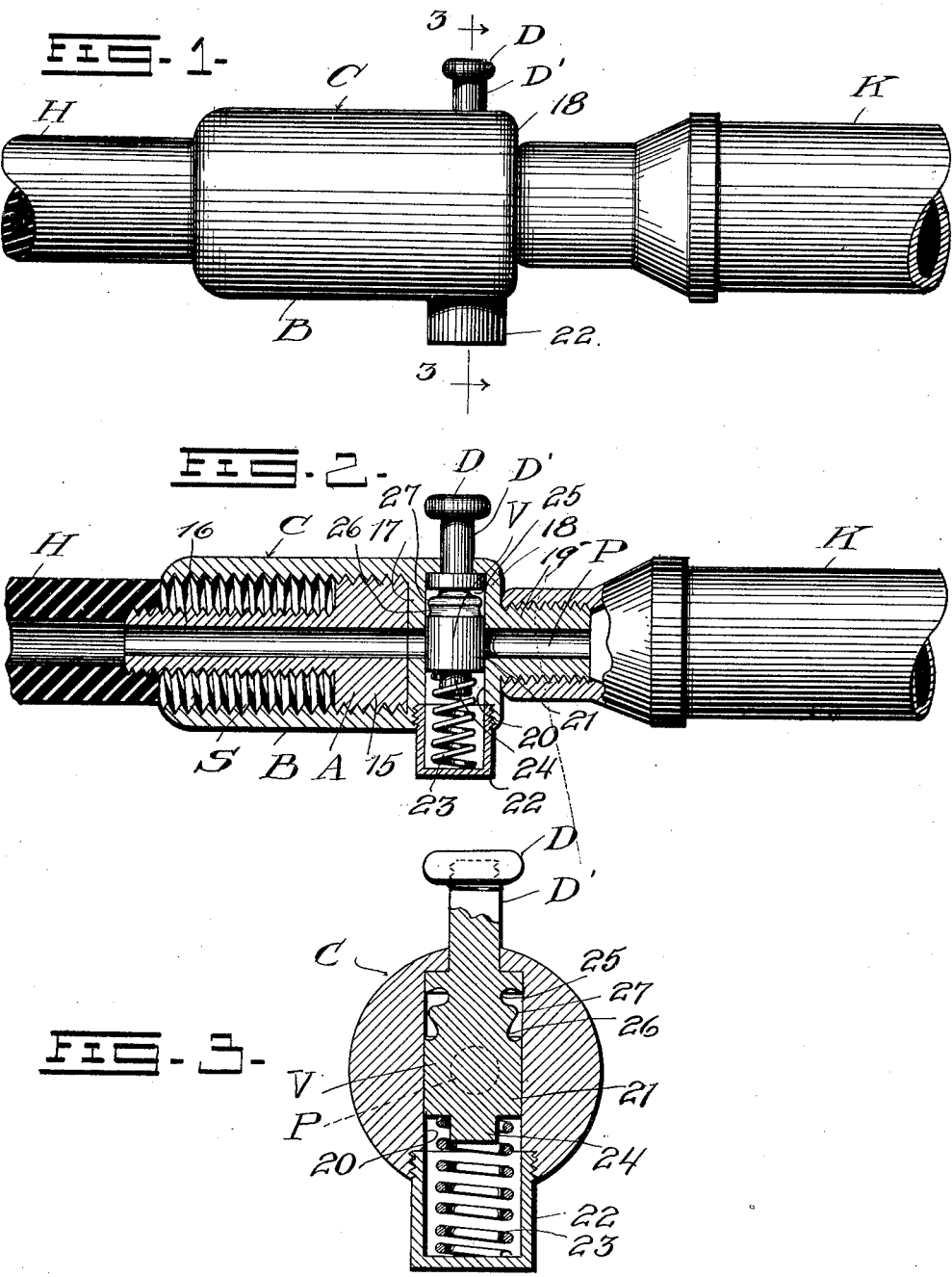
WITNESSES
Wynne Johnson
INVENTOR
W. S. Whyte
BY
ATTORNEYS

UNITED STATES PATENT OFFICE.

WILLIAM SIDNEY WHYTE, OF BEDFORD, INDIANA.

VALVE FOR PNEUMATIC TOOLS.

1,343,951. Specification of Letters Patent. Patented June 22, 1920.

Application filed July 19, 1919. Serial No. 311,964.

*To all whom it may concern:*

Be it known that I, WILLIAM S. WHYTE, a citzen of the United States, and a resident of Bedford, in the county of Lawrence and State of Indiana, have made certain new and useful Improvements in Valves for Pneumatic Tools, of which the following is a specification.

My invention relates to valves and particularly to a valve adapted to be inserted in a hose or conduit to control the flow of compressed air or other motive fluid to a pneumatic drill or the like.

An object of my invention is the provision of a valve of the above described character which is constructed to provide a gradual admission of compressed air to the drill to effect a variance in the power stroke of the drill, whereby the execution of fine and delicate work can be readily performed.

Another object of my invention is the provision of a simple and efficient means for attaching a valve hose or conduit to the drill casing.

I will describe only one form of valve and hose attaching means embodying my invention and will then point out the novel features thereof in claims.

In the accompanying drawings:

Figure 1 is a fragmentary view showing in side elevation, one form of valve and hose coupling embodying my invention.

Fig. 2 is a vertical sectional view of Fig. 1.

Fig. 3 is a sectional view taken on line 3—3 of Fig. 1.

Similar reference characters refer to similar parts in each of the several views.

Referring specifically to the drawings, K designates the casing for a pneumatic tool such as a hammer, drill or the like to which compressed air is supplied from a hose H through a coupling member designated generally at C. The coupling member comprises a cylindrical body B having a major part of its inner wall formed with screw threads S, as clearly shown in Fig. 2. This hollow portion of the body B is adapted to receive a coupling piece A comprising a head portion 15, which is threaded to engage the threads S, and a shank 16 which normally projects beyond the end of the body B. The shank 16 is designed to be inserted into the adjacent end of the flexible hose H and is threaded exteriorly to securely grip the wall of the hose for drawing the same within the body B. When securing the hose H to the coupling member C, the coupling piece A is first removed from the body B and its shank 16 inserted within the hose H. The head portion is now introduced in the body B and by rotating the latter the coupling piece is fed inwardly until it occupies the position shown in Fig. 2.

As shown in Fig. 2, the head portion 15 normally abuts a partition 17 formed interiorly of the body B. 18 designates the end wall of the body B which co-acts with the partition 17 to form a valve casing 20 for a valve designated generally at V.

Formed integral with the end wall 18 is a screw threaded annular extension 19 which is adapted to be inserted in the end of the tool casing K, as clearly shown in Fig. 2. P designates generally a passage in the coupling C for supplying compressed air to the tool casing K. In the present instance, the passage P is provided by forming the coupling piece A, the partition 17, and the end wall 18 with alined openings which coincide with the axis of the extension 19. In this manner a continuous passage is established with the hose H and the casing K.

As shown in Figs. 2 and 3, the valve V comprises a circular body portion 21 which is mounted for a sliding movement within the casing 20. The lower end of the casing 20 is normally closed by a cap 22 which has a screw threaded engagement with the partition 17 and the end wall 18, and acts as a support for a coiled retractile spring 23. The upper end of the spring 23 encircles a lug 24 formed of the lower end of the body 21, and such spring normally biases the body 21 upwardly to the position shown in Fig. 2. As shown to advantage in Fig. 3 the body 21 is formed adjacent its upper end with annular channels 25 and 26 spaced apart by an annular rib 27. These channels 25 and 26 act as ports for controlling the passage of compressed air from the hose H to the housing K, and when the body 21 occupies such a position that the channel 26 registers with the passage P, a small quantity of air from the hose H is allowed to traverse the passage P and enter the casing K. This effect is secure by virtue of the fact that the depth of the channel 26 is such that only a small quantity of air can pass therethrough, when such channel is in registration with the passage P. Channel 27 is relatively deep so that when removed into registration with the passage P, a greater quantity of air is admitted to the casing K.

The channels 25 and 26 are moved into registration with the passage P by means of a handle D which is detachably connected to a stem D' formed on the upper end of the body 21 and working through the upper end wall of the casing 20. It will be understood that in order to move the valve V to open position, the handle D is pushed downwardly so that the valve moves against the tension of the spring 23. After the valve body 21 has been moved downwardly a predetermined distance, the channel 26 registers with the passage P, and upon continued movement of the valve, both channels 25 and 26 now register with the passage P so that a full supply of compressed air is admitted to the casing K. It will thus be seen that when the valve is moved from closed position to full open position, a gradual increasing supply of air through the passage P is effected. Such a control obviously permits the operation of a pneumatic tool with power strokes of various intensities so that various characters of delicate work can be efficiently executed. When pressure upon the handle D is removed, the spring 23 forces the valve to closed position, as will be understood.

From the foregoing description, taken in conjunction with the accompanying drawings, it will be manifest that I have provided a hose coupling of simple and efficient construction, at the same time eliminating the use of wire clamps. It will be further noted that the construction of the valve V is such that an efficient regulation of the air supply is obtained to control the action of the pneumatic tool and thereby regulate the power of the tool.

Although, I have herein shown and described only one form of coupling and valve embodying my invention, it is to be understood that various changes and modifications may be made herein, without departing from the spirit of the invention and the spirit and scope of the appended claims.

Having described my invention, what I claim is:—

1. In combination, a body having a supply passage formed therein and a valve slidable in the body and controlling such passage, said valve comprising a body portion formed with a pair of annular channels.

2. In combination, a body and supply passage formed in the body, a valve slidable in the body and controlling said passage, means for biasing said valve to closed position, manually operable means for moving said valve to open position against said biasing means, and annular channels formed in said valve for effecting a gradual control of said passage.

3. In combination, a hose, a pneumatic tool casing, a coupling member connecting said hose and comprising a body portion, a coupling piece threadedly mounted in the body portion and having a portion thereof inserted with said hose, an extension formed on the body portion and threadedly engaging said casing, a valve casing formed in the body portion, an air supply passage formed in said coupling piece, a valve for controlling said passage, and means for biasing said valve to closed position.

4. A pipe coupling comprising a cylindrical body portion, a coupling piece adjustable longitudinally within the body portion, a threaded shank formed on the coupling piece and adapted to be inserted in the hose for drawing the latter into the body when said piece is adjusted longitudinally in one direction, a valve casing formed in the body portion and a valve slidable in said casing, and means for biasing said valve to one position.

5. A valve for a pneumatic tool comprising a cylindrical casing having ports formed therein, a circular body portion slidable in the casing, and channels formed in said body portion for effecting a gradual opening of said ports when the body portion is moved across the ports.

6. In combination, a valve casing, a valve body slidable in the casing, superposed annular channels formed in the valve body, a handle formed on one end of the body, an extension formed on the opposite end of the body, and a spring in the casing encircling said extension for biasing the valve body to one end of the casing.

WILLIAM SIDNEY WHYTE.